United States Patent [19]

Herden

[11] 4,352,085
[45] Sep. 28, 1982

[54] PRESSURE TRANSDUCER

[75] Inventor: Werner Herden, Gerlingen, Fed. Rep. of Germany

[73] Assignee: Robert Bosch GmbH, Stuttgart, Fed. Rep. of Germany

[21] Appl. No.: 248,433

[22] Filed: Mar. 27, 1981

[30] Foreign Application Priority Data

Apr. 10, 1980 [DE] Fed. Rep. of Germany ....... 3013857

[51] Int. Cl.³ ..................... H01L 10/10; H01L 43/06
[52] U.S. Cl. .................................. 338/42; 338/32 H
[58] Field of Search ..................... 338/32 H, 32 R, 42; 323/368; 73/728, 727, 722, 721, DIG. 3; 324/251, 252

[56] References Cited

U.S. PATENT DOCUMENTS

| | | | |
|---|---|---|---|
| 3,118,108 | 1/1964 | Zoss et al. | 324/251 |
| 3,344,850 | 10/1967 | Deforest | 324/251 X |
| 3,867,844 | 2/1975 | Shimizu et al. | 73/DIG. 3 X |
| 4,187,444 | 2/1980 | Gerard | 335/302 X |
| 4,254,395 | 3/1981 | Herden | 338/42 |

Primary Examiner—C. L. Albritton
Attorney, Agent, or Firm—Frishauf, Holtz, Goodman & Woodward

[57] ABSTRACT

Two permanent magnets at an adjustably fixed distance from each other face each other with like poles and are mounted on the moveable portion of a pressure-sensitive membrane, with one magnet near the membrane, and the other one at some distance away, while a Hall-effect sensor of fixed position is located between the magnets. The null point of the output scale and the scope of the transducer characteristic can be set either by adjusting the position of the magnets or by adjusting the amount of their magnetization.

6 Claims, 7 Drawing Figures $P \gtreqless 0$ $P \gtreqless 0$

PRESSURE TRANSDUCER

Related patent and application of the same inventor: U.S. Pat. No. 4,254,345 issued Mar. 3, 1981; and Application Ser. No. 200,764 filed on Oct. 27, 1980.

This invention concerns an improved pressure transducer of the general kind shown in my recently issued U.S. Pat. No. 4,254,395. Such transducers are particularly suitable for measuring a fluid pressure, especially gas pressure, by an electrical signal, and more particularly for measurement of the intake vacuum of an internal combustion engine, with the use of a membrane, a Hall-effect sensor unit and one or more permanent magnets.

Prior to the invention of my said patent, the known transducers of this type, as shown, for example, in German OS No. 16 73 938, were provided with a permanent magnet in an iron magnetic path in which a semi-conductor component operating as the Hall-generator dependent upon the magnetic field was located and, also, an air gap in which a regulating piece projected to modify the lines of force in the air gap. Such converters, however, required very high precision in manufacture and installation and, furthermore, had the disadvantage that they can be protected against appearance of dirt and grime in operation in a motor vehicle only with substantial difficulty and expense.

By the invention of my said patent, a first and second permanent magnet formed of an alloy of cobalt and a rare earth element were provided, having their respective poles of the same polarity facing each other and located on opposite sides of the Hall-effect center unit. The magnets were in fixed position, which is to say a position fixed with respect to the structure supporting the membrane, while the membrane acted to displace the Hall-effect device between them.

Certain constructional inconveniences were involved in the transducers of that invention, in order to bring to bear the effect of the membrane to displace the Hall-effect device because of the necessity of having the Hall-effect device moved between the two magnets along the axis on which the magnets faced each other.

THE INVENTION

It is an object of the present invention to make a pressure transducer having the advantages of those of my prior invention in which the construction of the transducer is more simple and reliable.

Briefly, the two permanent magnets are rigidly connected together and to a pressure-displaceable portion of the membrane, thus moving with the moving membrane portion as pressure changes occur, while the Hall-effect sensor remains in a position fixed within the casing of the instrument, located between the magnets that move so as to cause one of them to approach a Hall-effect device while the other recedes from it.

Preferably, the magnet nearer the membrane is mounted on the membrane on the surface thereof that faces the Hall-effect sensor and, preferably, the rigid connection between the two magnets is adjustable by virtue of the support bracket which fixes the relative position and passes around the Hall-effect device, being adjustable at least in the direction parallel to the axis along which the magnets face each other.

The advantage of the arrangement is that having the magnets move rather than the Hall-effect device makes it possible to replace the membrane or the aneroid chamber of which the membrane is a portion without disturbing the Hall-effect device and makes it possible once the adjustment of the distance between the magnet has been set, to make the instrument meet specifications by magnetizing or demagnetizing the magnets to provide the null point at the proper place and to provide the specified slope for the electrical signal with respect to pressure.

THE DRAWINGS

The invention is further described by way of example with reference to the annexed drawings, in which:

FIGS. 1–6 are diagrammatic cross-sectional views of embodiments of the invention of my said U.S. Pat. No. 4,254,395; and FIG. 7 is a diagrammatic cross-section of a preferred embodiment of the present invention.

DESCRIPTION OF THE ILLUSTRATED EMBODIMENTS

Figure 1:
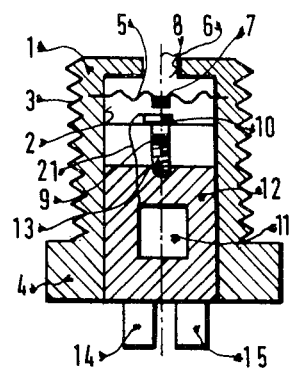

The transducer shown in FIG. 1 is designed to be built into the air-intake pipe of a vehicular motor that is not shown in the drawing. It comprises a metallic casing 1 with a central longitudinal bore 2 and external screw-threading for screwing the pressure converter into the wall of the air-intake pipe. For such insertion, a hexagonal flange 4 is provided on the lower end section of the casing 1.

Inside the casing 1 is a corrugated membrane 5 clamped at its edges where it joins the walls of the bore 2. The membrane 5 carries, on its bottom side that faces away from a central inlet aperture 6, a squat cylindrical permanent magnet 7 made of a cobalt-rare-earth compound. The magnet 7 moves in the direction of the longitudinal axis 8 of the force converter in response to varying pressures operating on the membrane 5. This upper permanent magnet 7 is opposite to a second permanent magnet 9 located at a small axial spacing from the first and also centered on the longitudinal axis 8. The magnet 9 is of the same kind of material as the magnet 7, and preferably both are made of a well-known cobalt and samarium permanently magnetic composition. Both magnets 7 and 9 are magnetized in the direction of the longitudinal axis already mentioned in such a manner that their opposing end faces have the same polarity.

More or less in the middle between the two magnets, the Hall generator element 10 is provided that in a preferred form is a part of a monolithic integrated semiconductor circuit (IC), which comprises, in addition to the Hall generator, a constant current source, an amplifier and provisions for temperature compensation. The integrated circuit delivers an output voltage which is proportional to the magnetic induction present at the location of the Hall generator, which voltage is supplied then to an evaluation or processing circuit symbolically shown at 11. The processing circuit makes possible calibration or equalization and permits the adjustment of the zero point and of the slope in such a manner that a particular linear characteristic region will be traversed by the axial movement of the upper permanent magnet. The evaluation or processing circuit 11 can be made in the form of a so-called hybrid circuit (i.e. containing discrete components mounted on a unitary circuit) and, in the illustrated example, is mounted in a damping mass 12 of elastic material of the rubber type, for protection against the effects of vibration. The lower permanent magnet 9, serving for compensation, is seated on the free end of a positioning screw 13 that enables the magnet 9 to be axially adjusted to fix the point of zero induction. In this manner, it is directly possible to obtain an approximately linear relation between the pressure acting on the membrane 5 and the output voltage with a maximum displacement of the upper permanent magnet 7 of about 0.5 mm. On the underside of the casing, three electrical connection contacts are provided, of which only the two contacts 14 and 15 are shown in the drawing.

The particular advantage of the pressure converter results from the following factors:

1. The position of magnetic induction $B=0$ lies in the middle between the two magnets 7 and 9.

2. The place of induction $B=0$ is readily adjustable mechanically by displacement of the compensation magnet 9, particularly if the screw 13 is provided with fine threading.

3. The control signal can proceed from $B=0$ as reference, which results in operation in the favorably linear region of the Hall-IC.

4. The recognition of overpressure and underpressure is provided in a simple fashion, by whether $B>0$ or $B<0$.

5. By displacement in the region of null induction, a very high linearity of the dependence of the output voltage on the induction is provided.

6. Since no background induction (offset) is present, high amplification is possible, and in consequence, high precision.

7. By affixation of the first magnet to the membrane, all mechanical guiding for the magnets is dispensed with.

Figure 2:
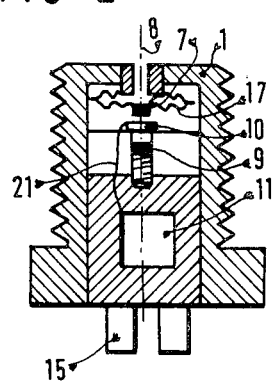

FIG. 2 shows another embodiment in which the pressure converter utilizes a pressure chamber 17 with corrugated flexible walls instead of a single membrane, the upper magnet 7 being affixed on the underside of the chamber. Parts that are the same as or have the same function as those of FIG. 1 are designated by the same reference numerals. The chamber 17 communicates with the interior of the engine intake pipe through its mounting bushing 17a. The remaining components of this second embodiment are like those of FIG. 1.

Figure 3:
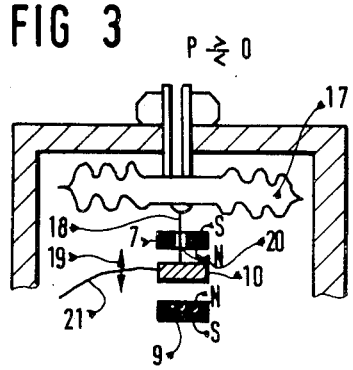

In the embodiment shown in FIG. 3, the pressure chamber 17 is again utilized. In this case the holder rod 18 is affixed to the underside of the chamber 17 on which the Hall-IC 10 is seated and is moved up or down in the direction of the arrows 19 with changing pressure P. The upper permanent magnet 7, like the lower permanent magnet 9, is fixed in position, the upper magnet having a central passage bore 20 for the holder rod 18.

Figure 4:
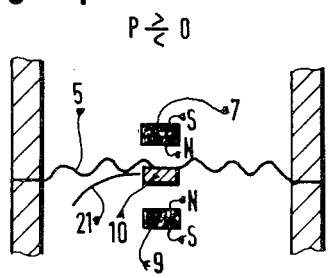

FIG. 4 shows still another embodiment of a pressure converter according to the invention, utilizing a membrane 5 which in contrast to that of FIG. 1, carries the Hall-IC 10 on its underside. The upper component magnet 7 is above the membrane 5. The lower magnet 9 below the membrane 5 has the same axial spacing from the Hall-IC 10 as the upper permanent magnet 7 in the rest position (no intake underpressure or overpressure). As in the embodiments described above, this IC is connected by flexible leads 21 to an evaluation or processing circuit designated 11 as in FIGS. 1 and 2.

Figure 5:
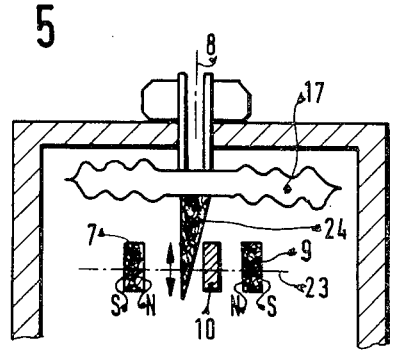

In the illustrative embodiment shown in FIG. 5, the two permanent magnets 7 and 9 are arranged coaxially with the Hall-IC 10 on a cross axis 23 perpendicular to the longitudinal axis 8, at fixed spacings and orientation. For pressure-dependent influencing of the magnetic induction effective at the location of the Hall-IC 10, a magnetically soft wedge-shaped armature piece 24 is provided on the underside of the pressure chamber 17 which extends more or less deeply through the intermediate space between the left permanent magnet 7 and the Hall-IC 10, moving in the direction of the arrows 25 parallel to the longitudinal axis 8 of the pressure converter when the pressure to be measured changes.

The advantages set forth in connection with the device of FIG. 1 apply also to the embodiments according to FIGS. 2 to 5.

The embodiments shown in FIGS. 3 and 4, as the result of the fact that only the Hall element is moved by a membrane or membranic chamber, have the advantage of a particularly good linearity of the output voltage as a function of the pressure.

Figure 6:
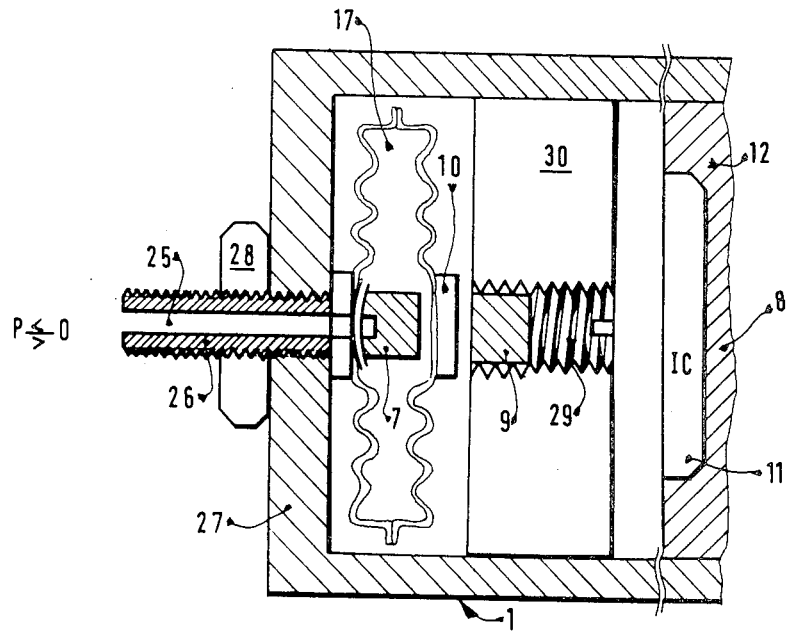

The illustrative embodiment shown in FIG. 6 is a preferred form of apparatus. There, just as in FIGS. 3 and 5, a pressure chamber 17 is provided which is seated on a threaded bushing 26 having a longitudinal bore 25. The bushing 26 can be turned to insert it more or less deeply into the bore 27 of the casing 1 for adjustment of the chamber 17 and can be fixed into the adjusted position by means of a counter-nut 28. On the inside of the membrane of the pressure chamber 17 which is connected to the threaded bushing, the first Co Sm magnet 7 is mounted in fixed position relative to the casing 1. This magnet is set with a polarity opposing that of the second Co Sm magnet 9, which is to say that like poles are facing each other. The magnet 9 is seated on an adjustable threaded stud 29 which is screwed into a tapped bore in a transverse partition or strut 30. The Hall element 10 is disposed between the two magnets 7 and 9 and affixed in the center on the membrane of the chamber 17 which faces away from the magnet 7. An integrated circuit unit 11 for processing or evaluation of the voltage delivered by the Hall-effect unit 10 is located on an extension of the axis 8, mounted by means of a damping mass 12.

The embodiment illustrated in FIG. 6 offers the following advantages:

1. Very good linearity, since the Hall element 10 is caused to move and the two magnets 7 and 9 are fixed in their spatial position.

2. The use of a pressure chamber of the membrane type is more favorable than a single membrane with regard to linearity and precision.

3. The device lends itself readily to simple manufacturing procedures.

Figure 7:
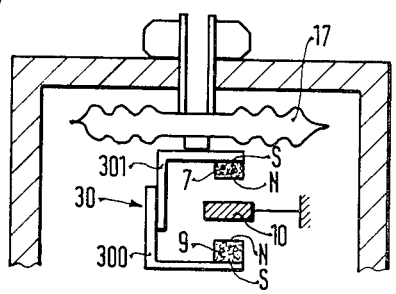

FIG. 7 shows a preferred form of transducer according to the present invention. As in the case of FIGS. 3, 5 and 6, a pressure chamber 17 is provided, the membranes of which are caused to deviate from their rest position in accordance with the pressure to be measured. A bracket 30 is fastened on the pressure chamber 17, being affixed to the portion of the chamber wall membrane which is displaced in accordance with the pressure to which the chamber 17 is exposed.

The bracket 30 consists of two bracket elements 300 and 301 which can be shifted one against the other, so as to increase or reduce the spacing between the arms of the bracket elements on which are mounted the permanent magnets 7 and 9, respectively. The magnets 7 and 9 are mounted in such a way on the bracket 30 that poles of the same polarity face each other across a space between the magnets. In the illustrated case these are north poles. A Hall-effect device 10 is located between the legs of the bracket 30 on which the permanent magnets 7 and 9 are located, the Hall-effect device being in fixed position in the instrument and located on the axis between the centers of the facing north poles of the magnets 7 and 9, this axis being parallel to the direction of displacement of the center of the face of the chamber 17, where the bracket element 301 is mounted on the chamber wall.

If now, as the result of a change in pressure, the lower membrane of the chamber 17 is displaced, the two permanent magnets 7 and 9, rigidly connected thereto, move in accordance with the pressure change. Since both the magnets 7 and 9 are moved, the output characteristic of the pressure transducer in terms of output voltage with respect to pressure has good linearity. By mechanical adjustment of the bracket 30 as a whole with respect to Hall-effect device 10, which may be done by adjusting the position of the membrane in the instrument (up and down in FIG. 7), the zero point of the output scale can be set and by shifting of the bracket elements 300 and 301 towards each other, the steepness of the characteristic can be separately adjusted. Zero point and slope can likewise be adjusted by magnetizing or demagnetizing one or both of the magnets 7 and 9.

The embodiment of FIG. 7, like that of FIGS. 1, 2, 3, 5 and 6 can, of course, be provided in a form for measuring absolute pressure rather than pressure difference, by using a closed pressure chamber 17 instead of an open one as shown in these Figures.

Although the invention has been described with reference to a particular illustrative embodiment, it will be understood that further variations and modifications are also possible within the inventive concept.

I claim:

1. A transducer for measuring pressure comprising a membrane mounted so as to be at least in part displaced by pressure to which it is exposed, a Hall-effect device for producing an electrical signal dependent upon the magnetic field in which it is located, a first permanent magnet mounted for producing a magnetic field such as to provide output of said Hall-effect device which is proportional to the pressure to which said membrane is exposed, a second permanent magnet on the opposite side of said Hall-effect device from which said first permanent magnet, said first and second magnets facing each other with like magnetic poles, and further comprising the improvement which consists in that:
   said first and second magnet are connected together and to a pressure-displaceable portion of said membrane by rigid structure so that the relative position of said magnets remains fixed and both may be displaced by said membrane relative to the Hall-effect device located between them.

2. A transducer as defined in claim 1, in which an adjustable bracket (30) is provided for rigidly connecting said first and second magnet (7, 9), said bracket being adjustable at least for adjusting the spacing between said brackets.

3. A transducer as defined in claim 1, in which said first permanent magnet (7) is mounted on said membrane (17) so as to be located between said membrane and said Hall-effect device.

4. A transducer as defined in claim 2, in which said first permanent magnet (7) is mounted on said membrane (17) so as to be located between said membrane and said Hall-effect device.

5. A transducer as defined in claim 1, in which the magnetization of said magnets (7, 9) is adjusted so to provide a specified zero point and slope in the electrical signal provided by said Hall-effect device in response to changes in pressure to which said membrane is exposed.

6. A transducer as defined in claim 1, 2, 3, 4 or 5, in which said magnets (7, 9) consist of a cobalt-samarium compound.

* * * * *